Patented Dec. 1, 1931                                          1,834,770

UNITED STATES PATENT OFFICE

LEONCE DE LAMBERT, OF LYON, FRANCE, ASSIGNOR OF ONE-HALF TO PIERRE ZUCCO, OF SAN FRANCISCO, CALIFORNIA

PROCESS FOR PRODUCING A HYDRAULIC ALUMINOUS BINDING MATERIAL TOGETHER WITH AN IRON ALLOY

No Drawing.         Application filed May 14, 1929. Serial No. 363,114.

This invention relates particularly to a process for producing cement.

An object of this invention relates to a process for the fabrication of melted cement and iron alloy by-products from the same raw materials.

A further object of the invention consists in adding phosphorous and carbonaceous materials to a mixture of aluminous material and lime stone, in order to lower the melting point of the entire mixture below what it would be when the phosphorous material is not used and by the agency of the carbonaceous material to facilitate the separation of the iron compounds from the aluminous material and limestone during reduction.

Other objects of the invention relate to a process for producing an aluminous binding material and iron allow by-products that will be superior in point of simplicity, inexpensiveness of manufacture, positiveness of operation, and facility and convenience in use and general efficiency.

In this specification, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the practice of my process of producing melted cement and iron alloys from a mixture of aluminous material, such as ferriferous bauxite, and limestone and iron compounds, such as manganiferous ore, or other manganic or metallic ores, I have found that on account of the aluminous ores containing a certain proportion of ferric compounds, such as iron oxide, that it is necessary to maintain the mixture during reduction at a temperature in excess of 1100 degrees C. to effectively separate the resultant binding material product and iron alloy. In my process I prefer to use a half and half mixture of bauxite and limestone. These particular proportions of bauxite and limestone are composed of the following chemical ingredients:

|                | $SiO_2$ | $Al_2O_3$ | $Fe_2O_3$ | $TiO_2$ | CaO   | MgO  |
|----------------|---------|-----------|-----------|---------|-------|------|
| Bauxite (50%)  | 5.05    | 27.       | 7.50      | 1.65    |       |      |
| Limestone (50%)| 0.85    | 0.50      |           |         | 26.45 | 0.50 |
|                | 5.90    | 27.50     | 7.50      | 1.65    | 26.45 | 0.50 |

It is to be noted that the bauxite contains a certain amount of $Fe_2O_3$ and that the limestone contains mostly CaO, and that following a reduction under heat of the above charge that a more or less complete mixture of iron and carbon is produced. This product has a melting point in excess of 1100 degrees C. and is of irregular formation and constitution and is of inferior value as a by-product for cast iron fabrication.

In the practice of my process I utilize a metallurgical furnace, suitably heated to produce the temperature desired, into which I continuously or intermittently introduce the mixture of the iron and aluminous ores and limestone. As the mixture reaches the reduction zone of the furnace, it is heated to a point of liquation at substantially 1100 degrees C., at which point the melted cement and melted iron alloys separate. The melted iron alloy, being heavier than the melted cement, runs out of the said furnace through an outlet separate from and on a level lower than the outlet through which the melted cement passes from the said furnace. The melted iron alloy that passes from the furnace is run into suitable molds to form "ingot-iron," while the melted cement is also run into suitable containers in which it is cooled after which it is suitably broken up into powder to form cement.

I have found it practicable to produce cement and iron alloys in accordance with steps of the process hereinbefore set forth. I have found it to be an improvement on the previously stated process to add a phosphorous material to the mixture of the aluminous and iron ores and limestone. The phosphorous material when mixed with the other ingredients in a reduction furnace reduces the liquation temperature to about 800 degrees C., or substantially 300 degrees less than the point of liquation when the phosphorous material is not used.

Where phosphorous material is added to the mixture of the aluminous and iron ores and limestone, I reduce the proportion of the ingredients to substantially 47% bauxite, 45% limestone and 8% phosphorite. Each of these products is composed of the following ingredients:

|  | $SiO_2$ | $Al_2O_3$ | $Fe_2O_3$ | $TiO_2$ | CaO | MgO | $P_2O_5$ |
|---|---|---|---|---|---|---|---|
| 47% bauxite | 4.74 | 25.38 | 7.00 | 1.56 |  |  |  |
| 45% limestone | 0.80 | 0.45 |  |  | 23.50 | 0.60 |  |
| 8% phosphorite |  | 0.06 |  |  | 1.76 |  | 1.68 |

Also in conjunction with the phosphorous material I have found it good practice to add from 10% to 15% of a carbonaceous reducer such as charcoal coke or the like, to the mixture which tends to more readily reduce the iron oxide contained in the iron and aluminous ores and limestone mixture. By the use of the phosphorous material and the carbonaceous reducer a saving of substantially 300 degrees in heat in the oven or reduction furnace is gained, tending to make the reduction process more economical, and to obtain an iron alloy by-product of equal price and sometimes higher than that obtainable for the principal product, aluminous cement.

For the fabrication of a ton of aluminous cement in accordance with the steps of my process, where phosphorite is used, I employ the following ingredients in the following proportions:

|  | Kgs. |
|---|---|
| Bauxite | 808 |
| Limestone | 774 |
| Phosphorite | 138 |
|  | 1720 |

The 808 kgs. of bauxite contain substantially 121 kgs. of $Fe_2O_3$. The addition of the phosphorite to the mixture reduces the ultimate amount of the $Fe_2O_3$ to substantially 84 kgs. of ferro-phosphorous. I have found that to practice my process with the mixture of bauxite, limestone, phosphorous material, and carbonaceous reducer, is more economical for the up-keep of the furnace and its various parts, as the phosphorous material when melted keeps in a liquid state for a longer time from which is derived an economy, on account of the greater regularity of heat in addition to the lowering in the heat of reduction, which results from the using of the phosphorous material.

Thus by my invention from a single furnace and a single process I am able to produce melted cement and a high grade melted iron alloy simultaneously at a greater economy in the production of said products, and the operation of the furnace, than where the said products would be produced separately, and in accordance with other processes.

I have found by operating the furnace at the stated temperature of substantially 800 degrees C. that the reduction of the aluminous and iron ores and the lime stone is more effective and also that the smaller the degree of heat in the furnace the longer the life of the furnace will be. Methods of reducing the cementitious and iron materials at temperatures in excess of 1100 degrees C. causes quickened deterioration of the ovens and constant stoppages in the reduction process. By my process of using phosphorous, the reduction of the raw materials is materially hastened and better resultant products are obtained.

Having thus described this invention, what I claim and desire to secure by Letters Patent is:—

1. Process for producing hydraulic aluminous cement and an iron alloy by-product comprising: reducing the fusion temperature of a charge of ferriferous bauxite and limestone in substantially equal proportions, and slightly less than 100% of the entire mixture, by adding thereto a relatively small proportion of phosphorous material, effecting the chemical reduction of the iron oxides in the mixture for the purpose of improving the character of the iron alloy by-product by adding to the mixture a relatively small proportion of a carbonaceous reducer, fusing the mixture at the reduced temperature thus made possible, and while still fluent, effecting the separation of the cement material from the iron alloy.

2. Process for producing hydraulic cement and an iron alloy by-product, comprising: reducing the fusion temperature of the charge of ferriferous bauxite and limestone by adding thereto a relatively small proportion of phosphorous material, and simultaneously effecting the chemical reduction of the iron oxides in the mixture, for the purpose of improving the character of the iron alloy by-product, by adding to the mixture a relatively small proportion of a carbonaceous reducer, the bauxite and limestone being taken in substantially equal proportions and constituting approximately 85% of the entire mixture, fusing the mixture at the reduced temperature thus made possible, and while still fluent, separating the cement from the iron alloy.

In testimony whereof I affix my signature.

LEONCE DE LAMBERT.